United States Patent [19]

Kahn et al.

[11] Patent Number: 5,167,020

[45] Date of Patent: Nov. 24, 1992

[54] SERIAL DATA TRANSMITTER WITH DUAL BUFFERS OPERATING SEPARATELY AND HAVING SCAN AND SELF TEST MODES

[75] Inventors: Michael F. Kahn, Kirkland; Richard M. Brodhead, Renton, both of Wash.

[73] Assignee: The Boeing Company, Seattle, Wash.

[21] Appl. No.: 356,797

[22] Filed: May 25, 1989

[51] Int. Cl.[5] .................. G06F 1/00; G06F 12/00; G11C 7/00

[52] U.S. Cl. .................. 395/250; 364/238.7; 364/239.7; 364/265.1; 364/266; 364/266.3; 364/266.4; 364/267.2; 364/267.6; 364/926.3; 364/926.5; 364/939.3; 364/946; 364/939

[58] Field of Search .................. 364/200, 239, 239.1, 364/239.2, 238.7, 265, 265.1, 900, 939.2, 939.5, 200, 900; 371/21.3, 22.3; 365/219; 395/200, 250

[56] References Cited

U.S. PATENT DOCUMENTS

| | | | |
|---|---|---|---|
| 3,751,649 | 8/1973 | Hart, Jr. ................ | 371/21.3 |
| 4,207,687 | 6/1980 | Haas et al. ............. | 364/200 |
| 4,222,116 | 9/1980 | Groves .................. | 364/900 |
| 4,344,127 | 8/1982 | McDaniel et al. ....... | 364/900 |
| 4,368,512 | 1/1983 | Kyu et al. .............. | 364/200 |
| 4,385,349 | 5/1983 | Ashford et al. ......... | 364/900 |
| 4,450,538 | 5/1984 | Shirasaka ............... | 365/219 |
| 4,486,856 | 12/1984 | Heckel et al. .......... | 364/900 |
| 4,488,259 | 12/1984 | Mercy ................... | 364/900 |
| 4,594,711 | 6/1986 | Thatte .................. | 371/22.3 |
| 4,597,080 | 6/1986 | Thatte et al. .......... | 371/22.3 |
| 4,607,345 | 8/1986 | Mehta ................... | 364/900 |
| 4,670,877 | 6/1987 | Nishibe ................. | 371/22.3 |
| 4,707,805 | 11/1987 | Narusawa et al. ....... | 364/900 |
| 4,727,509 | 2/1988 | Johnson et al. ......... | 364/900 |
| 4,789,960 | 12/1988 | Willis .................. | 364/900 |
| 4,795,355 | 5/1988 | Eichelberger .......... | 371/22.3 |
| 4,809,216 | 2/1989 | Lai ..................... | 364/900 |
| 4,817,093 | 3/1989 | Jacobs et al. .......... | 371/22.3 |
| 4,821,226 | 4/1989 | Christopher et al. .... | 364/900 |
| 4,823,302 | 4/1989 | Christopher ........... | 364/900 |
| 4,823,312 | 4/1989 | Michael et al. ........ | 364/900 |
| 4,841,525 | 6/1989 | Lieske et al. ......... | 371/21.3 |
| 4,868,784 | 9/1989 | Marshall et al. ....... | 364/900 |
| 4,887,267 | 12/1989 | Kanuma ................. | 371/22.3 |
| 4,893,072 | 1/1990 | Matsumoto ............. | 371/22.3 |
| 4,912,395 | 3/1990 | Sato et al. ........... | 371/22.3 |
| 4,945,518 | 7/1990 | Muramatsu et al. ...... | 365/219 |

*Primary Examiner*—Dale M. Shaw
*Assistant Examiner*—Robert S. Hauser
*Attorney, Agent, or Firm*—Christensen, O'Connor, Johnson & Kindness

[57] ABSTRACT

An ARINC Specification 429 transmitter provided with self test capability. A dual transmitter (10) converts parallel data provided from an external source through a bidirectional data bus (12) to a serial data format corresponding to Aeronautical Radio Incorporated (ARINC) Specification 429. The dual transmitter includes two first-in-first-out (FIFO) storage buffers (20a, 20b), which may be used separately by each transmitter, or alternatively may be daisy chained to provide 128 words of buffered storage for one of the transmitters. One of two different fault detection tests or modes is enabled upon hardware or software reset of the dual transmitter. In a scan test mode, the dual transmitter transmits ARINC data while generating a signature value corresponding to the data for comparison to an expected signature value generated by an external microprocessor or computer, to detect errors in the data input to the device or a fault in the internal circuitry of the dual transmitter. In a self test mode, binary modulus two or modulus three configuration data are generated internally to fill the FIFO storage buffer(s) so that a signature value for the data can be determined and output through the data bus for comparison to an expected signature value. The self test mode only checks for errors or faults in the circuitry of the dual transmitter.

21 Claims, 4 Drawing Sheets

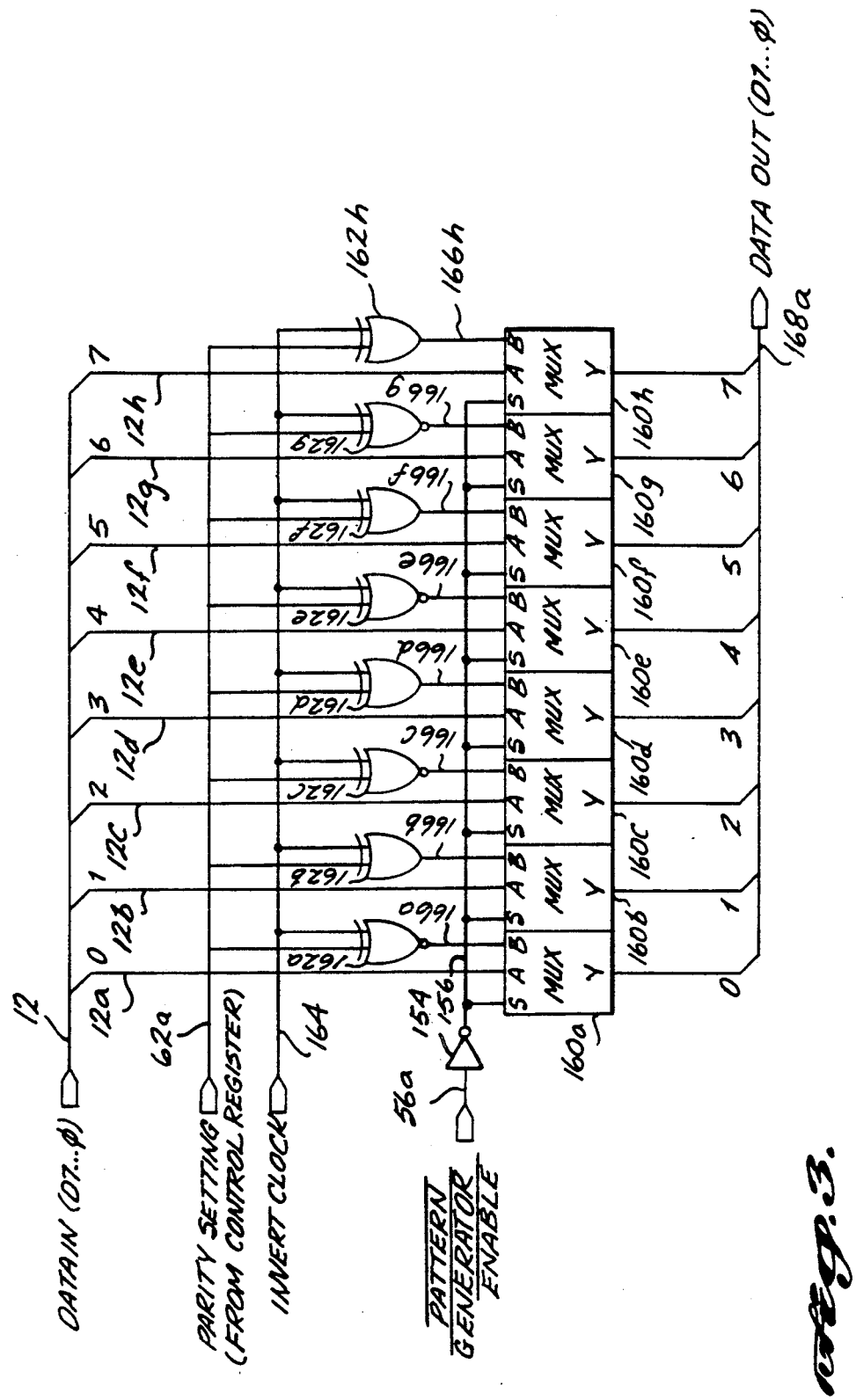

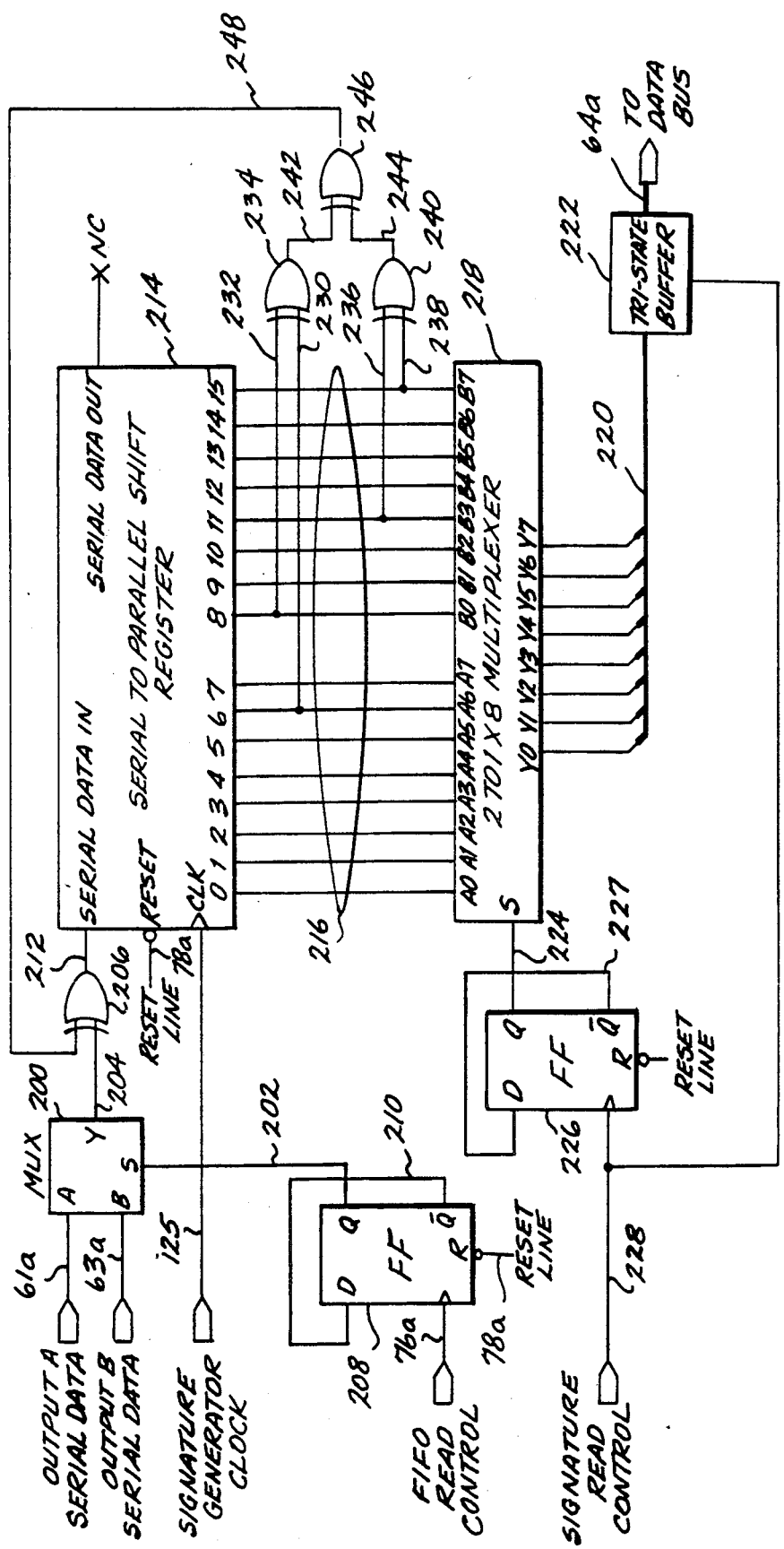

SERIAL DATA TRANSMITTER WITH DUAL BUFFERS OPERATING SEPARATELY AND HAVING SCAN AND SELF TEST MODES

TECHNICAL FIELD

The present invention generally pertains to a circuit for transmitting data over a serial bus, and specifically, to an integrated circuit used to convert parallel data to an appropriate format for transmission on an Aeronautical Radio Incorporated (ARINC) 429 serial data bus.

BACKGROUND OF THE INVENTION

Modern avionic systems on commercial aircraft typically transmit data from the cockpit to various flight surface controls, such as the stabilizer/trim rudder ratio changer module, yaw damper, and flap control unit, over a serial data bus. To minimize errors, a serial data format using different voltage levels on two conductors, described in Aeronautical Radio Incorporated (ARINC) Specification 429, has been developed for communication within and between avionic systems.

Integrated circuits that interface to an ARINC Specification 429 bus, i.e., to transmit and receive data, are already commercially available. For example, a Harris Model HS-3282 CMOS ARINC bus interface circuit includes dual receivers and a single transmitter section, and provides selectable data rates of either 12.5 kilobits per second or 100 kilobits per second, selectable word lengths of 25 or 32 bits, and an eight word first-in-first-out storage buffer. The small storage buffer on the Harris integrated circuit (IC) limits the amount of data that can be consecutively downloaded for transmission. Furthermore, due to the nonstandard word length it uses, the device cannot be easily interfaced directly to commonly available 8 and 16 bit microprocessors. Although the transmitter on the Harris chip can generate an internal self test signal that is input to both receiver sections, the self test is limited to detecting faults in the two receiver sections and cannot test for proper operation of the transmitter section, nor can it determine whether a fault exists in data input to the chip.

Accordingly, it is an object of the present invention to provide a serial data bus transmitter that includes a substantially greater storage buffer than presently provided on commercially available devices, enabling the transmitter to be addressed by an external microprocessor as if it were a memory location. A further object is to provide dual transmitters on a single integrated circuit. Yet a further object is to incorporate a fault detection test facility in the transmitter that can detect errors either in the data input or in the internal circuitry of the device. These and other objects and advantages of the present invention will be apparent from the attached drawings and the Description of the Preferred Embodiments that follows.

SUMMARY OF THE INVENTION

An integrated circuit is defined for accumulating and transmitting serial data in a predefined format. The integrated circuit (IC) comprises dual data input latches, each connected in parallel to a plurality of data input ports. The dual data input latches convert the parallel input data received to corresponding parallel data conforming in length to the predefined format. Dual storage buffers are connected to receive the converted data from the dual data input latches for storage on a first-in-first-out basis. In addition, dual shift registers, each connected to a serial data port, receive the parallel data from the storage buffers for transmission through the serial data ports as serial data. Control means are connected to the input latches, storage buffers, and shift registers, and are operative to configure the IC to selectively function as either a single transmitter or a dual transmitter. During operation as a single transmitter, the IC provides data output in the predefined format from only one of the serial data ports, but uses both of the storage buffers to store data for output through one of the shift registers for transmission from that serial data port. Conversely, when functioning as a dual transmitter, the IC provides data output in the predefined format from both serial data ports. In the latter configuration, each transmitter uses a different one of the storage buffers to provide data separately to the shift registers for transmission through the serial data ports.

The control means are further operable to run a fault detection test to detect faults within the integrated circuit or in the data incoming through the input ports. The fault detection test is selectably run in one of two modes. A scan test mode uses external data input to the IC to generate a signature value; a self test mode uses internally generated data for this purpose. The internally generated data fill the storage buffer and selectively comprise either a modulus three binary configuration or a modulus two configuration checkerboard binary pattern. The signature value generated during the fault detection test is provided to an external source and compared to an expected value to determine whether an error has occurred either in the incoming data or in the internal circuitry of the IC.

BRIEF DESCRIPTION OF THE DRAWINGS

FIG. 3 is a schematic diagram of a self test pattern generator portion of the IC; and FIG. 4 is a schematic diagram of a signature generator used in the IC.

DESCRIPTION OF THE PREFERRED EMBODIMENTS

Figure 1:
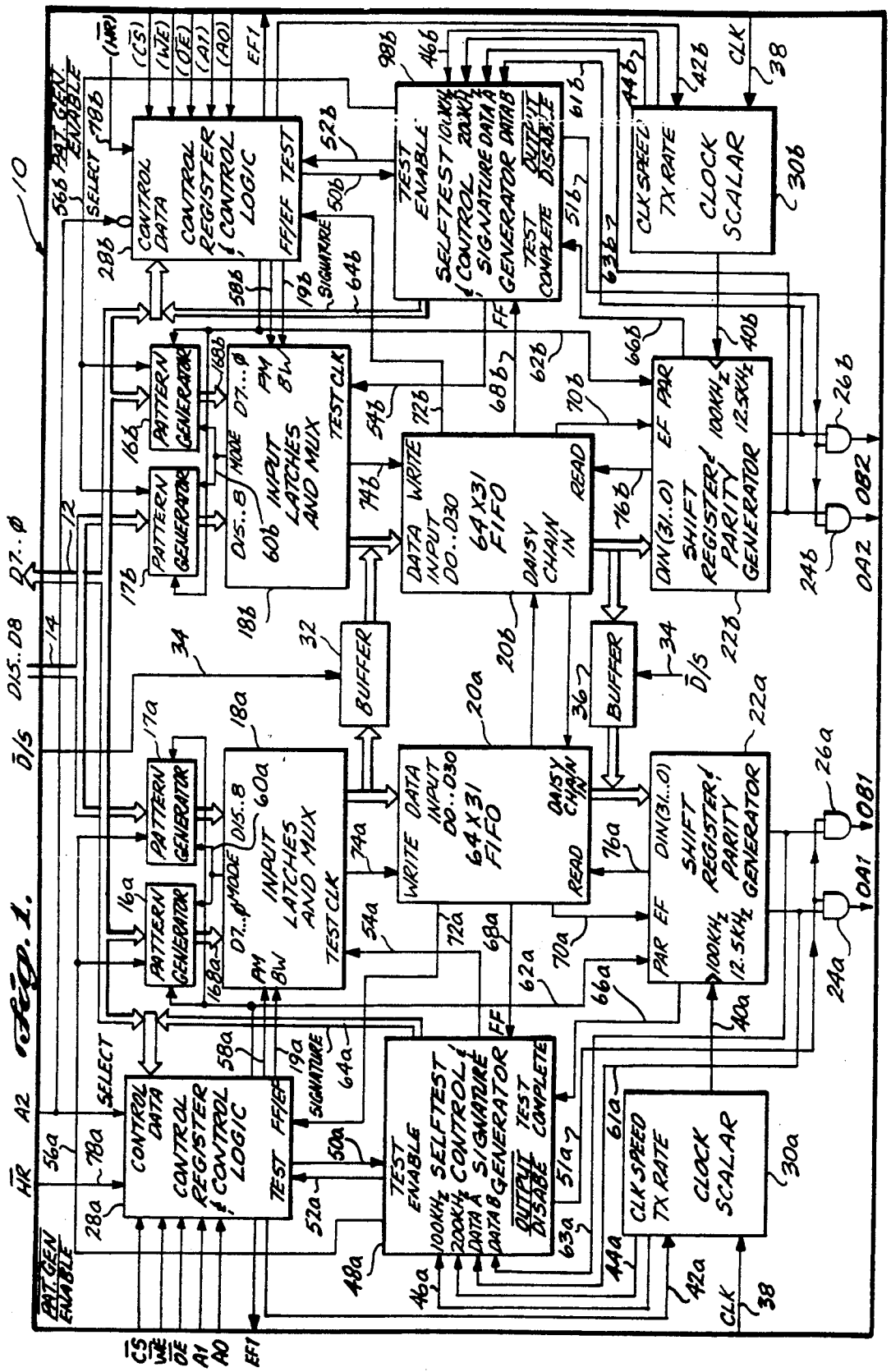
FIG. 1 is a schematic block diagram of a serial data transmitter integrated circuit.

A block diagram for a dual transmitter suitable for converting parallel data to serial data in conformance to the Aeronautical Radio Incorporated (ARINC) 429 timing format is shown generally in FIG. 1 at reference numeral 10, representative of an integrated circuit formed on a common substrate. Unlike prior ARINC 429 interface transmitters, dual transmitter 10 can selectively be used as a single transmitter having twice the internal buffer storage capacity for data compared to the capacity available when it is used as a dual transmitter. Since each transmitter on the substrate is substantially the same, the block diagram of dual transmitter 10 in FIG. 1 is almost symmetrical with respect to a vertical line through the center of the figure. To simplify the explanation of its operation, most of the components used in the dual transmitters are identified by a reference numeral having a suffix "a" or "b," the "a" suffix being used to identify components on the left half of dual transmitter 10, and the "b" suffix identifying components on the right half. Unless otherwise apparent, a reference numeral in the following explanation that refers to an element or component common to both of the transmitters may omit the suffix "a" or "b" to indicate that the explanation applies equally to the operation and function of the referenced component in both transmitters.

In another preferred form, the dual transmitter is supplied in a dual inline package having a total of 28 pins for input/output of control signals and data. The preferred embodiment of FIG. 1 uses a 40 pin ceramic, side brazed, dual inline package, where 8 of the additional pins are used for the higher order data bits, 8-15, enabling a full 16 bits to be input in parallel to dual transmitter 10. The 28 pin version is limited to data lines 0-7, permitting only 8 bits of parallel data to be input at a time, but is otherwise substantially equivalent in function and operation to the 40 pin embodiment described in detail below.

In FIG. 1, the 40 pin embodiment is shown in a block diagram in which the first 8 data bits of a 16 bit word are input through data lines D0-D7 on a bidirectional data bus 12. Similarly, the higher order 8 bits of data are input through data lines D8-D15 on a data bus 14. Both data buses 12 and 14 split inside dual transmitter 10, respectively, connecting to each transmitter at pattern generators 16 and 17. Pattern generators 16 and 17 are used during the self test function of dual transmitter 10, as described below. Output leads from each of pattern generators 16 and 17 are connected to input latches and multiplexer 18. A lead 19 conveys a bus width signal to input latches and multiplexer 18, indicating whether an 8 bit or a 16 bit data bus has been selected, since it is possible to use the 40 pin version to interface to an 8 bit parallel data source. The bus width signal conveyed on lead 19 is used to set up input latches and multiplexer 18 for the appropriate word length for the data that are input to it.

The output from input latches and multiplexer 18 is connected to the input of a first-in-first-out (FIFO) storage buffer 20. FIFO storage buffer 20 serves to store data input to dual transmitter 10 until it can be output on the ARINC 429 serial data bus. An externally generated clock signal controls the transfer rate of data into the FIFO storage buffer, in response to a Write signal provided by input latches and multiplexer 18.

Data output from FIFO storage buffer 20 is input to a shift register and parity generator 22, which loads the data from the FIFO storage register as a single 32 bit word for transmission in ARINC 429 serial format. Loading and transmission of the ARINC words continues until all data written to FIFO storage buffer 20 has been unloaded and transmitted, in response to a Read signal generated by shift register and parity generator 22.

Shift register and parity generator 22 only loads 31 bits from FIFO storage buffer 20 for each ARINC word to be transmitted. The 32nd bit is a parity bit calculated in shift register and parity generator 22, initialized by a signal from a control register and control logic block 28. Input latches and multiplexer 18 rearranges the data in the input latch, prior to loading FIFO storage buffer 20, and drops the 9th bit of each ARINC word. The lost bit is reestablished as a parity bit for transmission as the 32nd bit in the serial shift operation performed by shift register and parity generator 22.

In accordance with ARINC Specification 429, a serial word comprises 32 bits, each bit being represented by a differential voltage level carried on one of two wires; the potential on the two wires is allowed to float with respect to system ground. The differential voltage between the two wires is approximately zero during a "tNull" time interval that separates each bit of a word, and during a "tGap" time interval that separates each word. A pulse on one of the two leads comprising the ARINC 429 data bus, designated the "A" data line, rises to a level approximately five volts more positive than the voltage on the other lead, when a "one" bit is transmitted. The other lead, designated the "B" data line, carries a pulse that is approximately five volts more negative than the voltage on the "A" data line when a "zero" bit is transmitted.

Dual transmitter 10 produces an output signal at serial ports OA and OB comprising data bits that are timed according to ARINC Specification 429; however, the signal on OA1,2 is high for a one bit, while the signal on OB1,2 is high for a zero bit. These signals are referenced to system ground and both range between approximately 0 volts during tNull and tGap, to about +5 volts when a one or zero bit is output, as is customary for digital signals. The time interval between each bit, tNull, is the same duration as the time interval for each pulse representing one of the bits (i.e., one bit cycle), just as in ARINC Specification 429. Similarly, the time interval, tGap, between each ARINC word output from dual transmitter 10 is equal to 4.5 bit cycles, as required by the specification. Since the output signals on serial ports OA1,2 and OB1,2 (pins) are "digital," comprising different potentials than the "analog" signals used on the ARINC 429 serial data bus, a level shifter interface (not shown) is required to convert the output signals to the proper analog levels. A level shifter interface is also required to interface prior art ARINC Specification 429 transmitters to the ARINC 429 serial data bus and its design and operation are well known to those of ordinary skill in the art.

The signal output from serial ports OA1,2 and OB1,2 is provided by shift register and parity generator 22 through AND gates 24 and 26, respectively. During normal operation of dual transmitter 10, the other inputs to AND gates 24 and 26 are held high to enable data output from shift register and parity generator 22 through serial ports OA1,2 and OB1,2; conversely, the other inputs are selectively held low to inhibit data output from one or both serial ports.

The data transmission rate of dual transmitter 10 is controlled by a clock signal input to shift register and parity generator 22 from a clock scalar 30 over leads 40. The frequency of the clock signal input to the shift register and parity generator is preferably either 100 kHZ or 12.5 kHZ; this frequency establishes the serial data transmission rate over serial ports OA1,2 and OB1,2 and is selected according to the requirements of the ARINC 429 data bus to which dual transmitter 10 is connected.

As mentioned previously, dual transmitter 10 may be selectively operated as a single transmitter having twice the usual internal FIFO storage buffer capacity as available when used as a dual transmitter. Each FIFO storage buffer 20a and 20b has sufficient capacity for storing 64×31 bits of data, i.e., 64 ARINC 429 words (excluding the parity bit on each word). If operation of dual transmitter 10 as a single transmitter is desired, a logic level one signal input to a pin $\overline{D}/S$. This pin is connected through a lead 34 to a buffer 32 and a buffer 36. Buffer 32 is connected to the output from input latches and multiplexer 18a and comprises a plurality of switches that either selectively convey data output therefrom to FIFO storage buffer 20b, or isolate these two portions of the circuit from each other—depending upon whether the single transmitter mode of operation is selected. If the single transmitter mode is selected, once FIFO storage buffer 20a is filled with 64×31 bits of data, data output from input latches and multiplexer 18a are conveyed through buffer 32 into FIFO storage buffer 20b. Data stored therein are similarly output through buffer 36 into shift register and parity generator 22a in the single transmitter mode. All data are transmitted from FIFO storage buffers 20 on a first-in-first-out basis. More than 2K bits of data may be stored in dual transmitter 10 when it is configured as a single transmitter. The size of the FIFO storage buffers 20 and the rate of data transfer into these FIFO storage buffers allow the dual transmitter to download data from a high speed source, such as an external microprocessor (not shown), at a much faster rate than the data are transmitted over the ARINC data bus, particularly if the 12.5 kHz clock frequency is selected. During operation in the single transmitter mode, serial ports OA2 and OB2 are inactivated by providing a logic level zero input to AND gates 24b and 26b.

Most operations on dual transmitter 10 are controlled in response to a clock signal input through a pin, CLK, which is connected to clock scalar 30 by a lead 38. Clock scalar 30 divides down the frequency of this clock signal to each of the lower frequency clock signals used by different portions of dual transmitter 10 and responds to a signal carried over a lead 42 from control register and control logic block 28 to select either the 100 kHZ or 12.5 kHZ clock signal for input to shift register and parity generator 22. The clock signal input to the CLK pin over lead 38 can range between 2 MHz and 16 MHz; thus, an appropriate frequency divide factor must be applied. The frequency divide factor implemented by clock scalar 30 is a function of a signal input from control register and control logic block 28 over lead 42, and that signal is determined by three bits of a user provided 8 bit control register word, as described below. Clock scalar 30 also divides down the clock signal input on lead 38 to 100 kHZ and 200 kHZ clock signals, which are input to a self test control and signature generator block 48 over leads 46 and 44, respectively.

A fault test feature is provided in dual transmitter 10 that enables any errors or faults in the incoming data and/or in the internal components of the dual transmitter to be detected by comparing a signature value generated from the data that appears at the output of shift register and parity generator 22 with an expected signature value. Two different fault test modes may be implemented. In a self test mode, dual transmitter 10 fills FIFO storage buffer 20 with a checkerboard pattern of ones and zeroes and transfers the data to shift register and parity generator 22 one word at a time. The data generated to fill FIFO storage buffer 20 can be selectively configured in an alternating one/zero modulus two configuration (in which the pattern inverts in each successive word) or in a modulus three configuration (in which the pattern inverts generally after every third word), depending upon the value of a packing mode select signal, which is determined by the user and input to control register and control logic block 28. Self test is triggered by either a hardware or a control register reset, i.e., each time pin $\overline{HR}$ is forced to logic level zero or dual transmitter 10 is initially energized, or in response to a user writing a reset bit to the control register word. The self test mode cannot detect errors in the data input over data buses 12 and 14, but can determine if errors or faults exist in the internal circuitry of dual transmitter 10.

A scan test mode can be implemented to check the internal circuitry of dual transmitter 10 and the incoming data supplied to data buses 12 and 14, for both single and multibit errors. Errors in data input to transmitter 10 can occur, for example, as a result of a defect in the read only memory (ROM) in which the data are stored prior to transmission to dual transmitter 10, a fault in an interface (not shown) located between the external microprocessor supplying the data and dual transmitter 10, or as a result of noise in the circuitry through which the data are conveyed to the dual transmitter. The scan test mode is essentially transparent to "normal" operation of dual transmitter 10, so that the dual transmitter can be used for transmitting data to the ARINC 429 data bus when operating in this fault test mode. During operation in the scan test mode, self test control and signature generator block 48 is active to determine the signature value of data produced at serial output ports OA1,2 and OB1,2 for comparison against a signature value computed by an external microprocessor or other source (not shown) that is supplying the data to dual processor 10. The scan test mode terminates when FIFO storage buffers 20, and shift register and parity generators 22 are empty, following the transmission of all data loaded into dual transmitter 10. After the signature value corresponding to that data has been determined, it is available to be read by the external microprocessor or other source over data bus 12, at any time.

The self test control and signature generator block 48 is enabled to determine a signature value by a signal provided to it from control register and control logic block 28 over a lead 50. The status of a scan test or self test, i.e., whether a test is in progress, is denoted by a signal conveyed to control register and control logic block 28a over a lead 52 from self test control and signature generator block 48. A lead 54 conveys timing information used during the self test mode from self test control and signature generator block 48 to input latches and multiplexer 18. Also, during the self test mode, self test control and signature generator 48 provides a pattern generator enable signal over a lead 56 to pattern generators 16 and 17. The pattern generator enable signal causes the pattern generator to produce the one/zero pattern in modulus two or modulus three configuration to input latches and multiplexer 18. The packing mode, i.e., whether the self test data is modulus two or modulus three configuration, is determined by a signal provided by control register and control logic block 28 over a lead 58 to input latches and multiplexer 18, and subsequently input to pattern generators 16 and 17 over a lead 60.

The data output from shift register and parity generator 22 during a self test or scan test is conveyed to self test control and signature generator block 48 over leads 61 and 63, with leads 61 being connected to one input of AND gate 24 and lead 63 being connected to one input of AND gate 26. These leads are also respectively connected to the "A" and "B" data inputs of self test control and signature generator 48, thereby enabling it to determine a signature value for the data at the output of shift register and parity generator 22.

A lead 62 conveys a parity odd/even signal from control register and control logic block 28 to pattern generators 16 and 17 and shift register and parity generator 22. The signal on lead 62 is changed to invert each of the zeroes and ones filling FIFO storage buffer 20 during a self test, in either packing mode. It is preferable to run the self test twice, once with each parity, to insure that each logic state of the internal components is checked for errors. Shift register and parity generator 22 transmits a signal over a lead 66 to self test control and signature generator 48 indicating the completion of a self test or scan test, so that the signature value can then be output over a signature bus 64 for transmission through bidirectional data bus 12 to the external microprocessor or computer.

Although dual transmitter 10 has a substantially larger capacity FIFO storage buffer 20 than prior art devices that interface parallel data to an ARINC 429 data bus, it must include a provision for signaling when FIFO storage buffers 20 are full to prevent data in the FIFO storage buffers being overwritten. Accordingly, the empty/full condition of these buffers is indicated by signals output from FIFO storage buffers 20 over leads 72, which are connected to control register and control logic blocks 28. Each control register and control logic block 28 maintains a status register that includes bits indicating the condition of FIFO storage buffer 20, i.e., whether it is empty, at least half full, or full. Shift register and parity generator 22 is thus made aware of the condition of FIFO storage buffer 20 by the signal conveyed over a lead 70.

A Write signal conveyed from input latches and multiplexer 18 to FIFO storage buffer 20 over a lead 74 enables the writing of data into the FIFO storage buffer. Similarly, shift register and parity generator 22 enables FIFO storage buffer 20 to transfer data into the shift register and parity generator in response to a Read signal provided over a lead 76.

The hardware reset pin, $\overline{HR}$, on dual transmitter 10 is connected by a lead 78 to control register and control logic block 28. When the signal on lead 78 changes to a logic level zero, the components on dual transmitter 10 are reset, and the self test is initiated. Optionally, the reset function can be provided by changing the value of specific bits in the control register word. Control register and control logic blocks 28 control their respective transmitter in response to 8 bits that are set in the control register word stored therein. Each of these bits may be selectively set by a user, by writing the appropriate value to the 8 bit control register word on bidirectional data bus 12. Table 1 shows the 8 bits stored within the control register word and describes their function in controlling dual processor 10.

TABLE 1

| | | CONTROL REGISTER | | |
|---|---|---|---|---|
| Bit | Parameter | Description | Zero | One |
| 1 | Bus Width | Input Bus Width | 8 bit | 16 bit |
| 2 | Parity | 32nd bit of ARINC word | Even | Odd |
| 3 | TX Rate | Serial Output Rate | 12.5 kHZ | 100 kHZ |
| 4 | Packing Mode | Input Data Format | Mode 0 | Mode 1 |
| 5,6,7 | CLK Rate | External Clock Rate | 000 2 MHZ | 001 4 MHZ |
| | | | 010 6 MHZ | 001 8 MHZ |
| | | | 100 10 MHZ | 101 12 MHZ |
| | | | 110 14 MHZ | 111 16 MHZ |
| 8 | Reset | Software Reset | Reset | |

Also stored within each control register and control logic block 28 is an 8 bit status register word, which can be read by an external microprocessor or computer over bidirectional data bus 12. Table 2 sets forth the conditions defined by each bit in the status register word.

TABLE 2

| | STATUS REGISTER | |
|---|---|---|
| Bit | Condition | Description (When Bit Set High) |
| 1 | Empty | FIFO storage buffer is empty |
| 2 | Half Full | FIFO storage buffer is half full |
| 3 | Full | FIFO storage buffer is full |
| 4 | Overflow | Write to full FIFO storage buffer was attempted |
| 5 | Scan | A signature value is being generated using input data |
| 6 | Self Test | Self test is running |
| 7 | Buffer Size | 0=64 words deep; 1=128 words deep (1 or 0 Bit) |
| 8 | Not ready | Overflow, self test, FIFO full, or the device is in software reset. |

Control of dual transmitter 10 is also affected by signals input on pins $\overline{CS}$ (chip select), $\overline{WE}$ (write enable—enables a write to the control register and FIFO storage buffer); $\overline{OE}$ (output enable); and A0, A1, and A2 (select Read or Write location in transmitter 1 or transmitter 2). Selection of the various functions is set forth in the following Table 3.

TABLE 3

| | | | TRUTH TABLE | | | | |
|---|---|---|---|---|---|---|---|
| Mode | $\overline{OE}$ | $\overline{WE}$ | $\overline{OE}$ | A2 | A1 | A0 | Function |
| WRITE | L | L | H | * | H | H | Write to Ctrl Register |
| | L | L | H | * | L | H | Write to FIFO Buffer |
| | L | H | L | * | H | H | Read Control Register |
| READ | L | H | L | * | L | H | Read Status Register |
| | L | H | L | * | L | L | Read Signature |

* A2 High performs the specified operation at TX1; A2 Low executes the operation at TX2 (TX2 is disabled in single transmitter mode).

The term TX1 refers to the left half of dual transmitter 10, which is connected to serial ports OA1 and OB1, whereas TX2 refers to the right transmitter, which is connected to serial ports at OA2 and OB2. The logic level Low (L) or High (H) status of the signals input to the A1 and A0 pins determines whether data input to dual transmitter 10 are directed to the control register or to the FIFO storage buffers. Similarly, the data read on data bus 12 by an external microprocessor or computer are selected by the values on these pins; these data may comprise the 8 bit control register word, the 8 bit status register word, or the signature value resulting from a self test or scan test, as determined by the signal input to pins A1 and A0.

Figure 2:
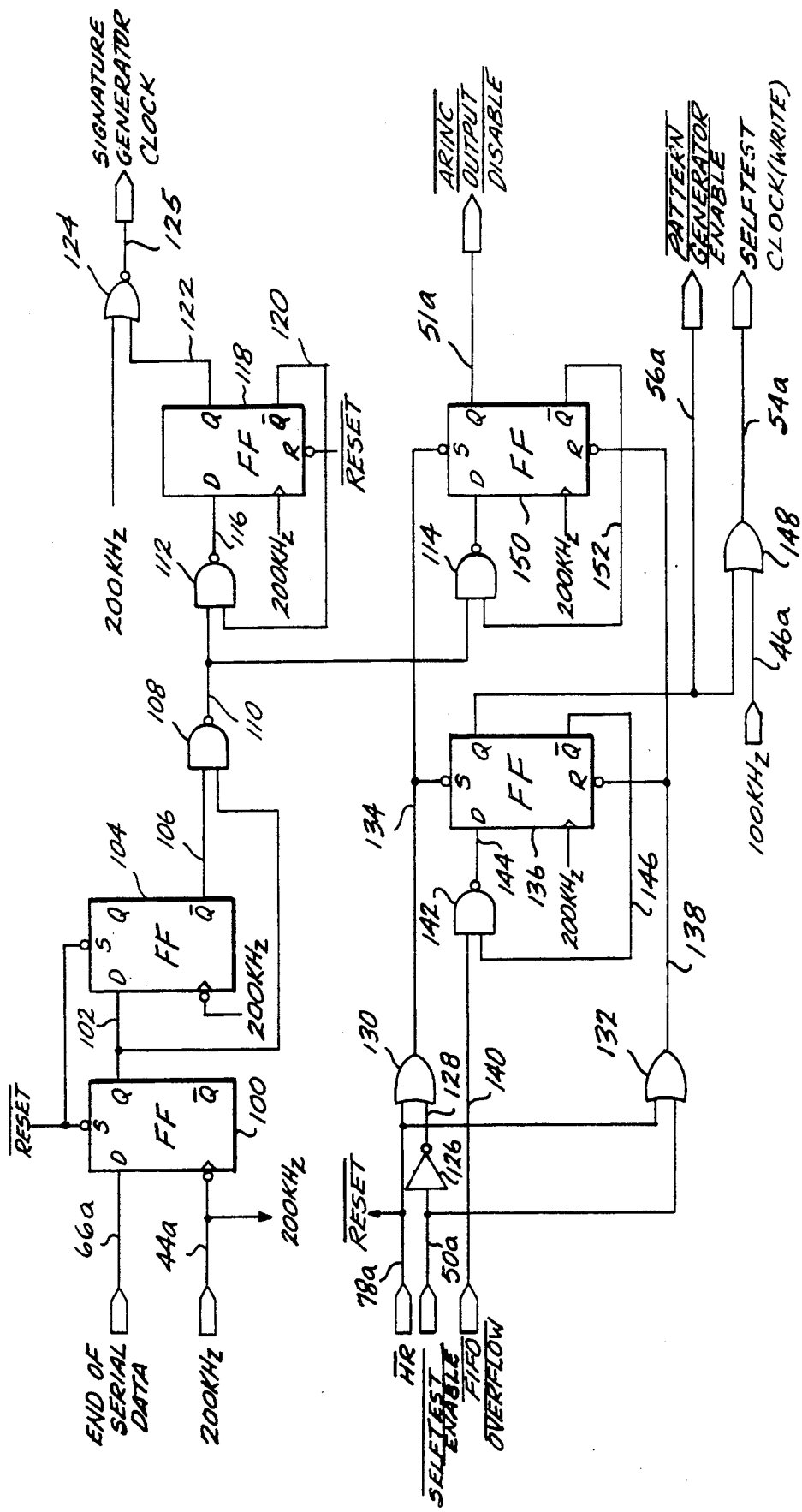
FIG. 2 is a schematic diagram illustrating a self test control logic portion of the integrated circuit (IC)

Turning now to FIG. 2, a block diagram illustrates details of the self test control logic for the left transmitter of dual transmitter 10. It will be understood that equivalent circuitry is provided in the right transmitter of dual transmitter 10. The self test control logic circuit shown in FIG. 2 includes flip flops 100, 104, and 118 that control a signature generator clock signal output on a lead 125. Two other flip flops 136 and 150 provide an ARINC output disable signal on a lead 51a, a pattern generator enable signal on lead 56a, and a self test clock signal on lead 54a. Each of flip flops 100, 104, 118, 136, and 150 are D-type flip flops having a D input terminal, a clock input terminal, and two output terminals, Q and $\overline{Q}$. Inversion of a signal at the input terminal of a component is indicated conventionally in FIG. 2, using a small circle at the terminal. The output of each of the flip flops toggles to whatever logic level is present on their D input at the occurrence of a positive going edge on the clock pulse (unless the clock pulse input is inverted at the input, causing the toggle to occur on the negative going edge of the clock pulse).

The D terminal of flip flop 100 is provided with an end of serial data signal on lead 66a and the flip flop responds to the negative going edge of a clock pulse at a frequency of 200 kHZ that is input to its clock terminal over lead 44a. A reset signal, $\overline{HR}$, is applied to each of the flip flops in the self test control logic circuit over lead 78a. The output from the Q terminal of flip flop 100 is conveyed through a lead 102a to the D input of flip flop 104 and to one input of a NAND gate 108. The $\overline{Q}$ terminal of flip flop 104 is connected to the other terminal of NAND gate 108 by a lead 106. A lead 110 conveys the output from NAND gate 108 to one of the inputs of a NAND gate 112, the output of which is connected through a lead 116 to the D terminal of flip flop 118. The $\overline{Q}$ output terminal of flip flop 118 is connected through a lead 120 to the other input of NAND gate 112, while the Q output of the flip flop is connected to one input of a NOR gate 124; the other input of the NOR gate is connected to the 200 kHZ clock signal. The signature generator clock (at 200 kHZ) is enabled at the output of NOR gate 124 on lead 125, only if the logic level on a lead 122 is zero.

A logic level zero reset signal, $\overline{HR}$, provided on lead 78a initializes the self test control logic circuit to begin either a scan test or a self test each time a hardware or software driven reset of dual transmitter 10 occurs. Specifically, the Q output of flip flop 100 and the $\overline{Q}$ output of flip flop 104 are respectively initialized to one and zero by the reset signal, causing NAND gate 108 to produce a logic level one signal that is input to NAND gate 112. Similarly, the reset signal that is applied to the reset terminal of flip flop 118 produces a logic level one on the $\overline{Q}$ terminal of that flip flop that latches the output of NAND gate 112 to zero. Thereafter, on the positive edge of the 200 kHZ clock pulse, the Q output of flip flop 118 is set to zero, enabling the 200 kHZ signal to pass through NOR gate 124 to lead 125, where it serves as the signature generator clock signal.

The signature generator clock signal is used by self test control and signature generator block 48a to determine a signature value. Once all data in the FIFO storage buffer 20a has been downloaded into shift register and parity generator 22a, the end of serial data signal provided by the shift register and parity generator over lead 66a changes from a logic level zero to a logic level one. Until the end of serial data condition occurs, the Q output terminal of flip flop 100 is at logic level zero and the $\overline{Q}$ output of flip flop 104 is at logic level one. Thus, the logic level at the output of NAND gate 108 remains high and the logic level on the output of NAND gate 112 remains low, enabling output of the signature generator clock signal. However, once the end of serial data signal goes high, the Q output of flip flop 100 changes to a logic level one on the negative edge of the 200 kHZ clock signal. Until the negative edge of the next 200 kHZ clock pulse, the $\overline{Q}$ output of flip flop 104 is also a logic level one. For one clock pulse period, the output of NAND gate 108 changes to a logic level zero, and the output of NAND gate 112 to a logic level one. Once the D input terminal of flip flop 118 changes to a logic level one, the logic level on the $\overline{Q}$ output connected to lead 120 changes to zero, effectively latching flip flop 118's Q terminal to a logic level one until the flip flop is again reset. Once the signal on the Q terminal of flip flop 118 goes high, the 200 kHZ signature generator clock signal on lead 125 is disabled.

The self test enable signal provided by control register and control logic block 28a in response to the operator selecting the self test mode is conveyed over lead 50a to the input of an inverter 126 and also to the input of an OR gate 132. The other input of OR gate 132 is connected to the reset signal on lead 78a. A lead 128 connects the output of inverter 126 to an input of an OR gate 130, its other input also being connected to the reset signal. The output of OR gate 130 is connected by a lead 134 to the set terminals of flip flops 136 and 150; similarly, the output of OR gate 132 is connected by a lead 138 to the reset terminals of those flip flops.

A FIFO overflow signal is generated when a Write to FIFO storage buffer 20 is attempted after it is full; this signal is conveyed over a lead 140 to one input of a NAND gate 142. The other input of that NAND gate is a logic level output from the $\overline{Q}$ terminal of flip flop 136, which is conveyed over a lead 146. The output of NAND gate 142 connects through a lead 144 to the D terminal of flip flop 136. The Q terminal of flip flop 136 provides the pattern generator enable signal on lead 56a and is also connected to one input of an OR gate 148, the other input of the OR gate being connected to the 100 kHZ signal that is provided over lead 46a. The output of OR gate 148 comprises the self test clock signal, which is conveyed over lead 54a.

One input of a NAND gate 114 is connected to the output of NAND gate 108 by lead 110, and the other input is connected to the $\overline{Q}$ terminal of flip flop 150 by a lead 152. The output of NAND gate 114 connects to the D input terminal of flip flop 150; the Q terminal generates the ARINC output disable signal carried by lead 51a.

Upon reset of dual transmitter 10, flip flops 136 and 150 are initialized so that their Q terminals are at logic level zero and their $\overline{Q}$ terminals at logic level one. The zero logic level input to OR gate 148 enables the self test clock signal, which corresponds to the 100 kHZ clock signal input over lead 46a. A logic level zero self test enable signal on lead 50a drives the input latches and multiplexer 18a to load an ARINC word from the self test pattern generator into the FIFO storage buffer. Inverter 126 inverts this signal for input to OR gate 130, causing its output to go to a logic level one during reset of dual transmitter 10. The resulting logic level one on the output of OR gate 130 is inverted at the set terminals of flip flops 136 and 150, providing a logic level zero signal to the set terminals of the flip flops. Similarly, the two logic level zero inputs to OR gate 132 produce a logic level zero output on lead 138, which is inverted at the reset terminals of flip flops 136 and 150, to a logic level one. Accordingly, the Q terminals of these flip flops are initialized during reset to a logic level zero, while the $\overline{Q}$ terminals are initialized to a logic level one. As noted above, a logic level zero input to OR gate 148 enables the 100 kHZ self test clock and the logic level zero signal provided to enable the pattern generator. Similarly, the ARINC output disable signal is set to the logic level zero value on lead 51a.

Referring back to FIG. 1, it will be apparent that if lead 51a is set to zero, AND gates 24a and 26a, which are connected to serial ports OA1 and OB1 are disabled, preventing output of ARINC data from those ports. Thus, during self test mode, dual transmitter 10 does not produce any serial data output corresponding to the self test pattern loaded into FIFO storage buffer 20a. However, leads 61a and 63a convey the output data from shift register and parity generator 22a back to self test control and signature generator block 48a for determination of the corresponding signature value during either the self test (and during scan test) mode. Data output from serial ports OA2 and OB2 are similarly enabled and disabled.

If scan test is enabled rather than self test, a logic level one appears on lead 50a, which is inverted to a logic level zero on lead 128 for input to OR gate 130. The output of OR gate 130 is then a logic level zero, but is inverted to a logic level one at the set terminals of flip flops 136 and 150. Similarly, the output of OR gate 132 is a logic level one, but is inverted to a logic level zero at the reset terminals of flip flops 136 and 150. As a result, flip flops 136 and 150 have a logic level one on their Q terminals and a logic level zero on their $\overline{Q}$ terminals. This condition disables the pattern generator, enables the ARINC output, and disables the self test clock signal on lead 54a. After the reset signal again goes high, the logic level provided at both the set and reset teminals on flip flops 136 and 150 change to zero, so that the flip flops are controlled by the inputs to their D terminals on the positive edge of the 200 kHZ clock pulse signal input to each flip flop.

If self test mode is enabled, the Q terminals of flip flops 136 and 150 remains at logic level zero during the self test; conversely, if scan test is enabled, the Q terminals remain at a logic level one during the scan test. The self test mode is terminated when the FIFO overflow signal on lead 140 changes to a logic level zero, causing the output of NAND gate 142 to change from a logic level zero to a logic level one. In addition, the signal applied on the Q terminal of flip flop 136 changes to a logic level one, disabling the pattern generator and self test clock, as previously explained. Similarly, diablement of the ARINC data output by the signal conveyed over lead 51a is terminated when all the serial data stored within FIFO storage buffer 20a is written into shift register and parity generator 22a. The signal on lead 110 from NAND gate 108 that is input to NAND gate 114 then changes from a logic level one to a logic level zero, causing the signal on the Q terminal of flip flop 150 to change to a logic level one.

Referring now to FIG. 3, a schematic of the circuitry of self test pattern generator 16a is shown; similar circuitry is implemented for pattern generators 16b, 17a and 17b. Pattern generator 16a passes through data input on data bus leads 12a-12h to input latches and multiplexer 18a over a data bus 168a during operation in the scan test mode and during normal operation of dual transmitter 10. However, during operation in the self test mode, any data input over data bus 12 is blocked by pattern generator 16a, and the internally generated self test data is instead provided to input latches and multiplexer 18a. Selection of the self test mode, which blocks data transmission from input data bus 12, is effected by the pattern generator enable signal that is input from self test control and signature generator through lead 56a. This lead is connected to an inverter 154, the output of which is conveyed through leads 156 to the select input terminals of a plurality of multiplexers 160a-160h, each of which is associated with one bit of the 8 bit data signal provided to input latches and multiplexer 18a over data bus 168a. An A input terminal of each of these multiplexers is connected to one bit of the 8 bit signal carried over data bus leads 12a-12h; a B input terminal of multiplexers 160a, 160c, 160e, and 160g is connected to the corresponding outputs of exclusive NOR gates 162a, 162c, 162e, and 162g through leads 166a, 166c, 166e, and 166g, respectively. Similarly, a B input terminal of multiplexers 160b, 160d, 160f, and 160h is connected to the corresponding outputs of exclusive OR gates 162b, 162d, 162f, and 162h through leads 166b, 166d, 166f, and 166h, respectively. One of the two inputs to exclusive NOR/OR gates 162 is a signal provided over lead 62a; this signal is indicative of the parity setting and determined by control register and control logic block 28a. The other input to the NOR/OR 162 gates is provided over a lead 164, and comprises an invert clock signal.

During either normal or scan test operation of dual transmitter 10, the signal provided over lead 56a is set high to disable the pattern generator and enable data pass-through. A logic level one appearing on lead 56 is inverted by inverter 154 so that a logic level zero appears on the select terminal of each of multiplexers 160a-160h. A logic level zero on each select terminal causes the multiplexers to select input A, so that the signal on input A appears at the output terminal Y of the multiplexer, enabling data on bidirectional data bus 12 to be passed through to the output data bus 168a. Conversely, during self test mode, the pattern generator enable signal on lead 56a goes low, causing a logic level one to appear on leads 156. A logic level one on the select terminal of multiplexers 160a-160h causes the B input to be connected to data bus 168a. The logic level of the parity setting provided over lead 62a is input to NOR gates 162a, 162c, 162e, and 162g and to OR gates 162b, 162d, 162f, and 162h. Assuming that a logic level zero is provided on invert clock lead 164, and that the parity setting is at a logic level one, the logic level pattern on leads 166a-166h is: 01010101. To generate a modulus two configuration, the invert clock changes logic levels after each word is written to FIFO storage buffer 20a. Thus, in modulus two operation, a signal on leads 166a-166h would change for the next word written to: 10101010. To produce the modulus three data configuration, the invert clock logic level changes every third word written to the FIFO storage buffer. A complete self test of dual transmitter 10 comprises filling FIFO storage buffers 20 with either modulus two or modulus three configuration data, determining the signature for the data, and then repeating the first two steps after changing the parity setting to its opposite logic level. By inverting the data, each storage bit position within FIFO storage buffers 20 is tested for both zero and one logic levels.

Both the self test and scan test modes of operation load data into shift register and parity generators 22 from FIFO storage buffers 20. The data output from shift register and parity generators 22 is input to self test control and signature generators 48, for determination of the signature value corresponding to this data. A block diagram representing the circuitry that carries out this operation is shown in FIG. 4, with respect to self test control and signature generator 48a. Serial data from shift register and parity generator 22a are provided over leads 61a and 63a to a multiplexer 200, at inputs A and B. A select signal is input over a lead 202 to the select terminal of multiplexer 200 from the Q terminal of a type D flip flop 208. The clock input terminal of flip flop 208 is connected through lead 76a to receive the FIFO read control signal, while its D input terminal is connected through a lead 210 to its $\overline{Q}$ terminal. A reset terminal on flip flop 208 is connected through lead 78a to the reset signal, $\overline{HR}$, which is driven low during a hardware or software reset. The reset signal is inverted at the reset terminal to a logic level one during a reset condition. When flip flop 208 is reset, the Q terminal is set to zero and the $\overline{Q}$ terminal is set to one. On the positive edge of each FIFO read control pulse signal input over lead 76a, the logic level of the signal at the Q terminal changes state, alternating between a one and zero. Thus, for each pulse on the read control signal, the input to multiplexer 200 alternately selects input A and input B, providing the selected signal over a lead 204 for input to an exclusive OR gate 206. The output of exclusive OR gate 206 is conveyed through a lead 212 to the serial data input port of a serial to parallel shift register 214. A reset signal, $\overline{HR}$, is provided through lead 78a to the reset terminal (inverted) of serial to parallel shift register 214, and a clock input terminal is connected to the signature generator clock signal provided on lead 125 (see FIG. 2). Since the signature generator clock runs at 200 kHZ, the signal on lead 212, which is connected to the serial data input terminal of the serial to parallel shift register, is sampled at either two or eight times the serial data transmission rate, depending upon whether the 100 kHZ or 12.5 kHZ transmission clock frequency is selected. Furthermore, since the FIFO read control signal changes level after the transmission of each 32 bit word, the signal on lead 204 alternates between ARINC outputs A and B only after each ARINC word is transmitted.

Serial to parallel shift register 214 produces an output signal on leads 216 that is conveyed to the input of a 2:1×8 multiplexer 218. Multiplexer 218 includes eight input terminals A0–A7 and eight input terminals B0–B7; the A and B groups of terminals are alternately selected in response to a signal input to the select terminal of the multiplexer through a lead 224. Lead 224 is connected to the Q terminal of a D type flip flop 226; its $\overline{Q}$ terminal is connected through a lead 227 back to its D input terminal. The clock terminal of this flip flop is connected through a lead 228 to an internally generated signature read control signal, comprising a pulse provided each time that either inputs A0–A7, or B0–B7 are selected for output at terminals Y0–Y7 of multiplexer 218. Output terminals Y0–Y7 of the multiplexer are connected through leads 220 to a tri-state buffer 222 that is connected to bidirectional data bus 12 through lead 64a. Tri-state buffer 222 isolates leads 220 from the data bus when a signature read control signal is not present on lead 228.

Selected bits of the data output from the serial to parallel shift register through leads 216 are connected back into the serial data input port of serial to parallel shift register 214. Specifically, bit 6 is connected through a lead 230 to one input of an exclusive OR gate 234, its other input being connected through a lead 232 to bit 8. Similarly, one input of an exclusive OR gate 240 is connected through a lead 236 to bit 11, and the other input of the OR gate is connected through a lead 238 to bit 15. The output from OR gates 234 and 240 are respectively connected to separate inputs of an exclusive OR gate 246 by leads 242 and 244. The signal output from exclusive OR gate 246 is conveyed through a lead 248 to the other input of exclusive OR gate 206; the output of OR gate 206 is connected to the serial data input port of the serial to parallel shift register. Accordingly, a logic level one appearing in only one of bits 6 or 8 when bits 11 and 15 are either both zero or both one, or a logic level one appearing on only one of bits 11 or 15 when bits 6 and 8 are both either logic level zero or logic level one produces a logic level one on lead 248. Otherwise, a logic level zero appears on lead 248. If a logic level one is present on lead 248, exclusive OR gate 206 is disabled until that condition changes, preventing the serial data selected from output A or output B from being input to the serial data input terminal of serial to parallel shift register 214. The particular data bits on leads 216 that are selected for input to exclusive OR gates 234 and 240 implement an algorithm for determining a signature value for the data present at outputs A and B that was developed by Hewlett-Packard, as described in "Signature Analysis: A New Digital Field Service Method," *Hewlett-Packard Journal*, May 1977, by R. A. Frohwerk.

In the scan test mode, the external microprocessor or computer providing input data through data buses 12 and 14 implements the same algorithm provided by the circuitry shown in FIG. 4 to determine an expected signature value for the data. The signature value determined by the signature generator shown in FIG. 4 is downloaded through bidirectional data bus 12 for comparison to the expected signature value generated by the microprocessor. Any difference between the two signature values indicates either an error in the data transmitted to dual transmitter 10 or an internal error in the circuitry of the dual transmitter. The self test mode can be implemented to generate an expected signature value, as set forth below in Table 4. The signature value determined by the signature generator circuitry of FIG. 4 can be compared to the expected signature value from Table 4 in the external microprocessor to determine whether a fault exists in the internal circuitry of dual transmitter 10.

TABLE 4

SELF TEST SIGNATURES

| PM | TX | PAR | BW | Test Time | Hexadecimal Signature Value |
|---|---|---|---|---|---|
| 64 Word Buffer ($\overline{D/S}$ pin Low) | | | | | |
| 0 | 0 | 0 | 0 | 187 ms | CE44 |
| 0 | 0 | 0 | 1 | 187 ms | CE44 |
| 0 | 0 | 1 | 0 | 187 ms | 2BD5 |
| 0 | 0 | 1 | 1 | 187 ms | 2BD5 |
| 0 | 1 | 0 | 0 | 26 ms | 855C |
| 0 | 1 | 0 | 1 | 24 ms | 9DD0 |
| 0 | 1 | 1 | 0 | 26 ms | BFF0 |
| 0 | 1 | 1 | 1 | 24 ms | 99D8 |
| 1 | 0 | 0 | 0 | 187 ms | A967 |
| 1 | 0 | 0 | 1 | 187 ms | A967 |
| 1 | 0 | 1 | 0 | 187 ms | 4CF6 |
| 1 | 0 | 1 | 1 | 187 ms | 4CF6 |
| 1 | 1 | 0 | 0 | 26 ms | 6119 |
| 1 | 1 | 0 | 1 | 24 ms | EAFB |
| 1 | 1 | 1 | 0 | 26 ms | 5BB5 |
| 1 | 1 | 1 | 1 | 24 ms | EEF3 |
| 128 Word Buffer ($\overline{D/S}$ pin Low) | | | | | |
| 0 | 0 | 0 | 0 | 374 ms | F134 |

TABLE 4-continued
SELF TEST SIGNATURES

| PM | TX | PAR | BW | Test Time | Hexadecimal Signature Value |
|----|----|-----|----|-----------|----------------------------|
| 0  | 0  | 0   | 1  | 372 ms    | F4E8 |
| 0  | 0  | 1   | 0  | 374 ms    | EDCD |
| 0  | 0  | 1   | 1  | 372 ms    | 08A8 |
| 0  | 1  | 0   | 0  | 52 ms     | 472F |
| 0  | 1  | 0   | 1  | 49 ms     | 8705 |
| 0  | 1  | 1   | 0  | 52 ms     | B4C5 |
| 0  | 1  | 1   | 1  | 49 ms     | 9F93 |
| 1  | 0  | 0   | 0  | 374 ms    | 190D |
| 1  | 0  | 0   | 1  | 372 ms    | 8B11 |
| 1  | 0  | 1   | 0  | 374 ms    | 05F4 |
| 1  | 0  | 1   | 1  | 372 ms    | 7751 |
| 1  | 1  | 0   | 0  | 52 ms     | 8714 |
| 1  | 1  | 0   | 1  | 49 ms     | 7CA6 |
| 1  | 1  | 1   | 0  | 52 ms     | 74FE |
| 1  | 1  | 1   | 1  | 49 ms     | 6430 |

As shown in Table 4, the hexadecimal signature value depends upon whether a 64 or 128 word FIFO storage buffer is selected, as determined by the logic level provided on the $\overline{D}$/S pin of dual transmitter 10, and by the selected parameters for packing mode (PM), transmission rate (TX), parity (PAR), and bus width (BW). Although the expected signature values for different test parameters are sometimes the same, the values are sufficiently unique to detect an error or fault condition with very high probability. The expected signature values generated during a scan test also vary according to parameters such as transmission rate and bus width. Since use of both FIFO storage buffers 20 for storage of data by a single transmitter requires approximately twice the time to fill and empty the total storage capacity, the times required to implement the self test for the 128 word buffer condition in Table 4 are approximately twice as long as those for the 64 word buffer condition. It will be apparent that when FIFO storage buffer 20b is used by the transmitter normally associated with FIFO storage buffer 20a, it is not available for use by the transmitter on the right half of dual transmitter 10 and accordingly, the self test mode for that transmitter is disabled.

Unlike prior art ARINC transmitters, dual transmitter 10 transfers data over data buses 12 and 14 sufficiently fast to enable the device to be addressed by an external microprocessor as if the dual transmitter were a memory location in random access memory (RAM), into which the data are being written. Since dual transmitter 10 includes larger FIFO storage buffer(s) 20 than available in prior art devices of this type, its speed is generally not limited by the rate that the data are converted to ARINC Specification 429 format and transmitted onto the serial data bus.

While the present invention has been disclosed with respect to a preferred embodiment, those of ordinary skill in the art will recognize that modifications to this embodiment may be made within the scope of the claims that follow below. Accordingly, it is not intended that the scope of the claims be in any way limited by the disclosure of the preferred embodiment, but instead that it be determined entirely by reference to the claims.

The embodiments of the invention in which an exclusive property or privilege is claimed are defined as follows:

1. An integrated circuit for accumulating parallel data and transmitting corresponding serial data in a predefined format, comprising:
   a) dual data input latches, each connected in parallel to a plurality of data input ports;
   b) dual storage buffers connected to receive and store parallel data from the dual data input latches and to consecutively produce corresponding data substantially conforming in length to the predefined format, on a first-in-first-out basis;
   c) dual shift registers, each connected to a different one of dual serial data output ports, said shift registers being connected to receive the data substantially conforming in length to the predefined format from the storage buffers for transmission through the serial data output ports in the predefined format; and
   d) control means, connected to the input latches, storage buffers and shift registers, and coupled to receive an externally produced dual/single select signal, for selectively configuring the integrated circuit in response to the dual/single select signal as one of:
      i) a single transmitter, providing data output in the predefined format from only one of the serial data output ports, using both of the storage buffers to provide the data conforming in length to the predefined format to one of the shift registers for transmission through said one serial data output port; and
      ii) dual transmitters, providing data output in the predefined format from both of the serial data output ports, each transmitter using a different one of the storage buffers to provide the data in the predefined format separately to the shift registers for transmission through the serial data output ports, said integrated circuit being thus selectively operable in both a single transmitter configuration and a dual transmitter configuration.

2. The integrated circuit of claim 1, wherein the control means are further operative to run a fault detection test to detect faults within the integrated circuit and in data incoming to the input ports.

3. The integrated circuit of claim 2, further comprising means, connected to said dual input latches, and said control means, for internally generating self-test data, wherein the fault detection test is selectably run in one of two modes, said two modes including a scan test mode using external data input to the integrated circuit, and a self test mode using internally generated data.

4. The integrated circuit of claim 3, wherein the internally generated data comprise a modulus three binary configuration.

5. The integrated circuit of claim 3, wherein the internally generated data comprise a checkerboard binary configuration.

6. The integrated circuit of claim 3, wherein the internally generated data fill the storage buffers in the self test mode.

7. The integrated circuit of claim 1, wherein the control means are further operative to configure the dual data input latches to selectively accept data having one of a plurality of different segment lengths.

8. The integrated circuit of claim 1, wherein the control means include an input that is connected to receive control data and means for storing a control register word in which the configuration of the integrated circuit is specified by control data input from an external source.

9. The integrated circuit of claim 1, wherein the dual data input latches and control means transfer data at rates substantially equal to the rates at which an external central processing unit to which it is connectable, transfers data to an addressable electronic memory.

10. The integrated circuit of claim 1, wherein the predefined format includes two signals that each vary between two disparate levels.

11. An integrated circuit for accumulating parallel data and transmitting corresponding serial data in a predefined format, comprising:
   a) means for latching data incoming through a plurality of data input ports;
   b) storage means, connected to the means for latching, for receiving the data latched and storing the data for output on a first-in-first-out basis, said storage means comprising dual first-in-first-out storage buffers;
   c) shift register means, connected to receive the data from the storage means, for transmitting the data through a serial data output port in accord with the predefined format; and
   d) control means connected to the means for latching, the storage means and the shift register means, and coupled to receive an externally produced dual/single select signal, for running a fault detection test to detect errors in the integrated circuit and the incoming data, by comparing a signature value generated by the control means during the fault detection test, with an expected result, wherein the control means selectively configure the storage buffers in response to the dual/single select signal in one of two configurations, including:
      i) a dual buffer configuration in which the storage buffers operate independently of each other; and
      ii) a single buffer configuration in which the storage buffers operate as a single storage buffer having a combined storage capacity equal to the sum of the storage capacities of the separate storage buffers, said integrated circuit being thus selectively operable in both the dual buffer configuration and the single buffer configuration.

12. The integrated circuit of claim 11, further comprising means, connected to said means for latching and to said control means, for internally generating self-test data, wherein the control means selectively run the fault detection test in one of two modes, including a scan test mode using externally generated data input to the means for latching data, and a self test mode using the internally generated self-test data.

13. The integrated circuit of claim 12, wherein the internally generated data comprise binary data that are stored in the storage means in a checkerboard pattern defined by alternating ones and zeroes.

14. The integrated circuit of claim 12, wherein the internally generated data comprise binary data stored in the storage means in modulus three configuration.

15. The integrated circuit of claim 14, wherein the internally generated self-test data test for errors in the storage means.

16. The integrated circuit of claim 12, wherein the means for internally generating self-test data are selectively configured to generate the self-test data in one of a plurality of packing mode formats for storage by the storage means during running of the fault detection test in the self-test mode.

17. The integrated circuit of claim 16, wherein the control register word configures the integrated circuit for operation to selectively have the shift register means append either an odd or an even parity bit to the data output on the serial data output port, sets a serial data output rate of the shift register means, and selects the packing mode of the self-test mode.

18. The integrated circuit of claim 11, wherein the control means produce a signature valve that matches the expected result upon successful completion of the fault detection test.

19. The integrated circuit of claim 11, wherein the control means include means for storing a control register word that determines the configuration of the storage buffers.

20. The integrated circuit of claim 19, wherein the means for latching are selectively configured to latch data in either eight or sixteen bit along segments.

21. The integrated circuit of claim 20, wherein the control register word determines the length of the segments.

* * * * *

UNITED STATES PATENT AND TRADEMARK OFFICE
CERTIFICATE OF CORRECTION

PATENT NO. : 5,167,020

DATED : November 24, 1992

INVENTOR(S) : M.F. Kahn et al.

It is certified that error appears in the above-identified patent and that said Letters Patent is hereby corrected as shown below:

| COLUMN | LINE | |
|---|---|---|
| [54] | 1-3 | "SERIAL DATA TRANSMITTER WITH DUAL BUFFERS OPERATING SEPARATELY AND HAVING SCAN AND SELF TEST MODES" should read --SERIAL DATA TRANSMITTER WITH DUAL BUFFERS OPERATING SEPARATELY OR TOGETHER AND HAVING SCAN AND SELF TEST MODES-- |
| 9 | 8 | after "input" insert --or output-- |
| 14 | 67 | "Low" should read --High-- |
| 18 | 42 | "along" should read --long-- |

Signed and Sealed this

Twenty-second Day of March, 1994

Attest:

BRUCE LEHMAN

*Attesting Officer*     *Commissioner of Patents and Trademarks*